United States Patent
Yokoyama et al.

(10) Patent No.: US 9,029,475 B2
(45) Date of Patent: May 12, 2015

(54) PROCESS FOR PRODUCING A LOW VOC COATING COMPOSITION AND USE THEREOF

(75) Inventors: Ayumu Yokoyama, Wallingford, PA (US); Jennifer Majlak, Turnersville, NJ (US); Ross Sydney Morgan, Avondale, PA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 1032 days.

(21) Appl. No.: 13/096,302

(22) Filed: Apr. 28, 2011

(65) Prior Publication Data

US 2011/0269884 A1 Nov. 3, 2011

Related U.S. Application Data

(60) Provisional application No. 61/329,202, filed on Apr. 29, 2010.

(51) Int. Cl.
| | | |
|---|---|---|
| *C09D 5/02* | (2006.01) | |
| *C09D 131/02* | (2006.01) | |
| *C09D 133/02* | (2006.01) | |
| *C09D 175/04* | (2006.01) | |
| *C09D 175/08* | (2006.01) | |
| *C08K 5/101* | (2006.01) | |
| *C08K 5/29* | (2006.01) | |

(52) U.S. Cl.
CPC ............ *C09D 5/024* (2013.01); *C09D 131/02* (2013.01); *C09D 133/02* (2013.01); *C09D 175/04* (2013.01); *C09D 175/08* (2013.01); *C08K 5/101* (2013.01); *C08K 5/29* (2013.01)

(58) Field of Classification Search
CPC .... C09D 5/024; C09D 131/02; C09D 133/02; C09D 167/00; C09D 175/04; C09D 175/08
USPC .................. 525/123, 127, 452, 453, 455, 460
See application file for complete search history.

(56) References Cited

U.S. PATENT DOCUMENTS

| | | | |
|---|---|---|---|
| 4,900,774 A | 2/1990 | Mitsuji et al. | |
| 6,309,707 B1 * | 10/2001 | Mayer et al. | 427/386 |
| 6,372,875 B1 * | 4/2002 | Mayer et al. | 528/60 |
| 6,426,414 B1 | 7/2002 | Laas et al. | |

OTHER PUBLICATIONS

HiChem Paint Technologies Pty. Ltd.; Material Safety Data Sheet for Solvent EEP, 2009, p. 1-5.*
Heterogeneous crosslinking of waterborne two-component polyurethanes (WB 2K-PUR); stratification processes and the role of water; Daniel B. Otts, Marek W. Urban, Polymer 46 (2005) 2699-2709.
Eastman EEP Solvent, "A Versatile, high-performance solvent," 2013, p. 1-8.

* cited by examiner

*Primary Examiner* — Robert Jones, Jr.
(74) *Attorney, Agent, or Firm* — Ingrassia Fisher & Lorenz, P.C.

(57) ABSTRACT

The present disclosure is directed to a process for producing a low VOC (volatile organic content) coating composition. The present disclosure is particularly directed to a process for producing a low VOC (volatile organic content) coating composition by mixing a water based crosslinking component and an organic solvent based crosslinkable component. The present disclosure is further directed to a low VOC coating composition produced by the process.

19 Claims, No Drawings

PROCESS FOR PRODUCING A LOW VOC COATING COMPOSITION AND USE THEREOF

CROSS REFERENCE TO RELATED APPLICATIONS

This application is a non-provisional of U.S. Provisional Application No. 61/329,201, filed Apr. 29, 2010, which claims are all hereby incorporated in their entirety by reference.

FIELD OF INVENTION

The present invention is directed to a process for producing a low VOC (volatile organic content) coating composition. The present invention is further directed to a low VOC coating composition.

BACKGROUND OF INVENTION

Coating compositions are utilized to form coatings, such as, for example, primers, basecoats and clearcoats, for protective and decorative purposes. These coatings can be used in automotive OEM and refinish coating applications and provide a protective layer for the underlying substrate and can also have an aesthetically pleasing value. The coating compositions can contain one or more organic solvents or other organic contents, known as volatile organic content (VOC) that may enter the environment.

Volatile organic compounds (VOCs) are compounds of carbon, which can emit into atmosphere and participate in atmospheric photochemical reactions. Many volatile organic compounds are commonly used in industrial products or processes, such as solvents, dispersants, carriers, coating compositions, molding compositions, cleaners, or aerosols. VOCs emitted into the atmosphere, such as those emitted from coating compositions during coating manufacturing, application and curing process, can be related to air pollution impacting air quality, participate in photoreactions with air to form ozone, and contribute to urban smog and global warming.

Efforts have been made to reduce VOC emissions into the air. For example, the coating industry has been trying to develop low VOC coating compositions. VOC exempt organic compounds can also be used to substitute or replace part or all VOCs in some industrial applications, such as coatings. The VOC exempt organic compounds are compounds of carbon and are believed not to participate in atmospheric photochemical reactions to form smog. Examples of VOC exempt compounds can include acetone, methyl acetate, and PCBTF (Oxsol 100). However, production of low VOC products or converting naturally occurring volatile organic compounds into VOC exempt organic compounds can require the consumption of additional materials and energy, which may in turn cause further increase in net output of other materials such as carbon dioxide that has been attributed to global warming.

Therefore, compositions of low VOC emissions are still needed.

STATEMENT OF INVENTION

This invention is directed to a process for producing a low VOC coating composition, the process comprising the steps of:
A) providing a crosslinking component comprising one or more water dispersible crosslinking agents, said crosslinking component comprises in a range of from 10% to 90% of water based on the weight of the crosslinking component;
B) providing a crosslinkable component comprising one or more organic solvents and at least one compound having one or more crosslinkable functional groups, said crosslinkable component comprises in a range of from 0% to 10% of water based on the weight of the crosslinkable component; and
C) mixing said crosslinking component and said crosslinkable component to produce said low VOC coating composition;

wherein, said low VOC coating composition comprises in a range of from 10% to 90% of water based on the weight of the low VOC coating composition and at least one of the one or more organic solvents is a water immiscible organic solvent.

This invention is also directed to a coating composition comprising:
(a) a crosslinking component comprising one or more water dispersible crosslinking agents, said crosslinking component comprises in a range of from 10% to 90% of water based on the weight of the crosslinking component; and
(b) a crosslinkable component comprising one or more organic solvents and at least one compound having one or more crosslinkable functional groups, said crosslinkable component comprises in a range of from 0% to 10% of water based on the weight of the crosslinkable component; and wherein, said coating composition comprises in a range of from 10% to 90% of water based on the weight of the coating composition and at least one of the one or more organic solvents is a water immiscible organic solvent.

This invention is further directed to an article coated by the process or the coating composition disclosed herein.

DETAILED DESCRIPTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "volatile organic compound", "VOC", "volatile organic compounds", or "VOCs" refers to organic chemical compounds of carbon that can vaporize and enter the atmosphere and participate in atmospheric photochemical reactions. VOCs can be naturally occurring or produced from natural or synthetic materials. Some or all VOCs can be regulated under local, national, regional, or international authorities.

The term "coating composition" can include any coating compositions known to or developed by those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to or developed by those skilled in the art. The coating composition can be formulated as a primer, a basecoat, or a color coat composition and can comprise dyes, pigments or effect pigments. The coating composition can also be formulated as a clearcoat composition. Clearcoat composition can further comprise certain pigments having same or similar optical properties, such as same or similar refractive index as the cured clearcoat. One of such pigments can be transparent silica. A coating composition can comprise one or more volatile organic compounds (VOCs).

The term "vehicle", "automotive", "automobile" or "automotive vehicle" can include an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport.

A coating composition can be applied over the surface of a substrate to form a coating layer using coating application techniques such as spraying, brushing, rolling, draw down, or any other coating application techniques known to or developed by those skilled in the art. The coating composition can comprise VOCs. Additional organic solvents, such as additional VOCs the same or different from what are already in the coating composition, can be added to the coating composition for modifying properties such as viscosity, rheology, drying time, sagging, appearance, or other properties of the coating composition or a coating layer resulted therefrom. The coating layer can be cured or dried to form a dry coating layer at room temperatures, also known as ambient temperatures, such as a temperature in a range of from 15° C. to 50° C., or at elevated temperatures, such as a temperature in a range of from 50° C. to 300° C.

Typically, the VOCs in coating compositions can be emitted from the coating compositions during manufacturing, preparation, application, curing or drying process. The emitted VOCs can be collected, for example, in a spray booth, or an enclosure such as a curing chamber or a baking facility. The emitted VOCs can also enter the atmosphere.

"Low VOC coating composition" means a coating composition that includes in a range of from 0.1 kilograms (1.0 pounds per gallon) to 0.72 kilograms (6.0 pounds per gallon), preferably 0.3 kilograms (2.6 pounds per gallon) to 0.6 kilograms (5.0 pounds per gallon) and more preferably 0.34 kilograms (2.8 pounds per gallon) to 0.53 kilograms (4.4 pounds per gallon) of VOCs per liter of the coating composition. The amount of VOC can be determined under the procedure provided in ASTM D3960.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The time it takes for the viscosity of the pot mix to increase to such point where spraying becomes ineffective, generally a two-fold increase in viscosity, is referred to as "pot life". The pot mix can be applied as a layer of a desired thickness on a substrate. After application, the layer dries and cures at ambient or at elevated temperatures to form a coating layer having desired coating properties, such as, adhesion, high gloss, mar-resistance and resistance to environmental etching.

The term "crosslinkable component" refers to a component having "crosslinkable functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during a curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The crosslinkable component can comprise acrylic polymers, polyesters, or a combination thereof. The crosslinkable component can have one or more aforementioned crosslinkable functional groups. The acrylic polymers or the polyesters can be linear or branched and can have one or more aforementioned crosslinkable functional groups.

The term "crosslinking component" refers to a component having "crosslinking functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include isocyanate, thioisocyanate and melamine functional groups each crosslinking with hydroxyl, thiol, primary and secondary amine, ketimine, or aldimine functional groups.

The crosslinking component can comprise one or more water dispersible crosslinking agents. The water dispersible crosslinking agents that are suitable for the coating composition of this invention can include compounds having crosslinking functional groups, such as isocyanates, and one or more modifiers.

The isocyanates can include organic polyisocyanates such as aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4, 4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexyl-methane-4,4'-diisocyanate, 3,3'-dimethyl-dicyclohexyl-methane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4, 6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

The isocyanates can be modified with one or more modifiers. The modifiers can be selected from polyalkylene or derivatives. For example, the isocyanate can be a reaction product of an isocyanate and one or more monofunctional polyalkylene alcohols, or a reaction product of an isocyanate and one or more monofunctional polyalkylene oxides.

This invention is directed to a process for producing a low VOC coating composition. The process can comprise the steps of:

A) providing a crosslinking component comprising one or more water dispersible crosslinking agents, said crosslinking component comprises in a range of from 10% to 90% of water based on the weight of the crosslinking component;

B) providing a crosslinkable component comprising one or more organic solvents and at least one compound having one or more crosslinkable functional groups, said crosslinkable component comprises in a range of from 0% to 10% of water based on the weight of the crosslinkable component; and C) mixing said crosslinking component and said crosslinkable component to produce said low VOC coating composition;

wherein, said low VOC coating composition comprises in a range of from 10% to 90% of water based on the weight of the low VOC coating composition and at least one of the one or more organic solvents is a water immiscible organic solvent.

The crosslinking component can be essentially free from organic solvents. As used herein, the phrase "essentially free from organic solvents" means that the crosslinking component can have in a range of from 0% to 5% of organic solvents.

At least one of the water dispersible crosslinking agents can comprise a reaction product of an isocyanate and one or more monofunctional polyalkylene alcohols, or a reaction product of an isocyanate and one or more monofunctional polyalkylene oxides. At least one of the monofunctional polyalkylene alcohols can be a polyethylene glycol. At least one of the monofunctional polyalkylene oxides can be a polyethylene oxide.

The isocyanate can be selected from aliphatic polyisocyanate, cycloaliphatic polyisocyanate, aromatic polyisocyanate, or a combination thereof. Suitable isocyanate can also be selected from 2,4-toluene diisocyanate, 2,6-toluene diisocyanate ("TDI"), 4,4-diphenylmethane diisocyanate ("MDI"), 4,4'-dicyclohexyl methane diisocyanate, ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, triphenyl methane triisocyanate, 1,3,5-benzene triisocyanate, 2,4,6-toluene triisocyanate, a trimer of hexamethylene diisocyanate, or a combination thereof.

The crosslinkable component can comprise one or more organic solvents and at least one compound having one or more of the aforementioned crosslinkable functional groups. Any typical organic solvents can be used for the crosslinkable component. The crosslinkable component can be essentially free from water. As used herein, the phrase "essentially free from water" means that the crosslinkable component can have in a range of from 0% to 10% of water. At least one of the one or more organic solvents in the crosslinkable component can be a water immiscible organic solvent. The term "water immiscible organic solvent" used herein refers to an organic solvent that has solubility in water in a range of from 0% to 2% weight percentage. Examples of water immiscible solvents can include, but not limited to, aromatic hydrocarbons. Further examples of water immiscible solvents can include toluene, xylene, methyl ethyl ketone, methyl isobutyl ketone, methyl amyl ketone, diisobutyl ketone, ethyl acetate, isobutyl acetate, and a combination thereof.

This invention is further directed to a coating composition. The coating composition can comprise:

(a) a crosslinking component comprising one or more water dispersible crosslinking agents, said crosslinking component comprises in a range of from 10% to 90% of water based on the weight of the crosslinking component; and (b) a crosslinkable component comprising one or more organic solvents and at least one compound having one or more crosslinkable functional groups, said crosslinkable component comprises a range of from 0% to 10% of water based on the weight of the crosslinkable component; and wherein, said coating composition comprises in a range of from 10% to 90% of water based on the weight of the coating composition and at least one of the one or more organic solvents is a water immiscible organic solvent.

The aforementioned crosslinking and crosslinkable components can be suitable.

The coating composition of this disclosure can further comprise one or more catalysts to reduce curing time and to allow curing of the coating composition at ambient temperatures. The ambient temperatures are typically referred to as temperatures in a range of from 18° C. to 35° C. Typical catalysts can include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to or developed by those skilled in the art.

The coating composition of this disclosure can comprise one or more solvents. Typically the coating composition can comprise up to 95% by weight, based on the weight of the coating composition, of one or more solvents. Typically, the coating composition of this disclosure can have a solid content in a range of from 20% to 80% by weight in one example, in a range of from 50% to 80% by weight in another example and in a range of from 60% to 80% by weight in yet another example, all based on the total weight of the coating composition. The coating composition of this disclosure can also be formulated at 100% solids by using a low molecular weight acrylic resin reactive diluent.

The coating composition of this invention can comprise in a range of from 10% to 90% in one example, 10% to 80% in another example, 10% to 70% in yet another example, 10% to 60% in yet another example, 10% to 50% in further another example, of water, as a solvent based on the weight of the coating composition.

The coating composition of this invention can comprise organic solvents. At least one of the one or more organic solvents in the crosslinkable component can be water immiscible. Any typical organic solvents can be used to form the coating composition of this disclosure. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof. The organic solvents can consist of one or more water immiscible organic solvents. Examples of the water immiscible organic solvents can include toluene, xylene, methyl ethyl ketone, methyl isobutyl ketone, methyl amyl ketone, diisobutyl ketone, ethyl acetate, isobutyl acetate, tert-butyl acetate also known as t-butyl acetate or t-butylacetate, dimethyl carbonate, and a combination thereof.

The coating composition of this disclosure can comprise one or more pigments in a pigment to binder weight ratio of 1/100 to 350/100. The coating composition can be used as a basecoat or topcoat, such as a colored topcoat. Conventional inorganic and organic colored pigments, metallic flakes and powders, such as, aluminum flake and aluminum powders; special effects pigments, such as, coated mica flakes, coated aluminum flakes colored pigments, a combination thereof can be used. Transparent pigments or pigments having the same refractive index as the cured binder can also be used.

The coating composition of this disclosure can also comprise one or more ultraviolet light stabilizers in the amount of 0.1% to 10% by weight, based on the weight of the binder. Examples of such ultraviolet light stabilizers can include ultraviolet light absorbers, screeners, quenchers, and hindered amine light stabilizers. An antioxidant can also be added to the coating composition, in the amount of about 0.1% to 5% by weight, based on the weight of the binder.

The coating compositions of this disclosure can further comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, leveling agents based on (meth)acrylic homopolymers; rheological control agents, such as highly disperse silica, fumed silica or polymeric urea compounds; thickeners, such as partially crosslinked polycarboxylic acid or polyurethanes; antifoaming agents; catalysts for the crosslinking reaction of the OH-functional binders, for example, organic metal salts, such as, dibutyltin dilaurate, zinc naphthenate and compounds containing tertiary amino groups, such as, triethylamine, for the crosslinking reaction with polyisocyanates. The additives are used in conventional amounts familiar to those skilled in the art.

In the process and the coating composition disclosed herein, the crosslinkable component can consist essentially of a solvent component and a binder component. The binder component can consist essentially of one or more binder compounds selected from the group consisting of one or more linear or branched acrylic polymers, one or more linear or branched polyesters, one or more linear or branched acrylic polymers having one or more aforementioned crosslinkable functional groups, one or more linear or branched polyesters having one or more aforementioned crosslinkable functional groups, and a combination thereof, wherein at least one binder compound has one or more of the aforementioned crosslinkable functional groups. The solvent component can consist essentially of in a range of from 0% to 10% of water and in a range of from 90% to 100% of one or more organic solvents. Any typical organic solvents can be used for the crosslinkable component. At least one of the one or more organic solvents can be a water immiscible organic solvent. All of the one or more organic solvents can also be water immiscible organic solvents. In one example, the solvent component can consist essentially of in a range of from 0% to 10% of water and in a range of from 90% to 100% of one or more water immiscible organic solvents. Any of water immiscible solvents can be suitable. Examples of the water immiscible organic solvents can include toluene, xylene, methyl ethyl ketone, methyl isobutyl ketone, methyl amyl ketone, diisobutyl ketone, ethyl acetate, isobutyl acetate, tert-butyl acetate, dimethyl carbonate, and a combination thereof. In one example, the water immiscible organic solvent can be selected from the group consisting of toluene, xylene, methyl ethyl ketone, methyl isobutyl ketone, methyl amyl ketone, diisobutyl ketone, ethyl acetate, isobutyl acetate, t-butylacetate, dimethyl carbonate, and a combination thereof. The crosslinkable component can be essentially free from water. As used herein, the phrase "consist essentially of" or "consisting essentially of" means the crosslinkable component can have other materials in an amount in a range of from 0% to 5% based on total weight of the crosslinkable component. Any of the aforementioned crosslinking components can be suitable.

The crosslinkable component is free from neutralization agents that are typically used to neutralize polymers for dissolving or dispersing the polymers into water. Examples of neutralization agent can include, but not limited to, acids, bases such as ammonia, or salts therefrom.

The coating composition disclosed herein can consist essentially of a crosslinking component, a crosslinkable component, and an additive component. Any of the aforementioned crosslinking and crosslinkable components can be suitable. The additive component can consist essentially of one or more additives selected from the group consisting of pigments, ultraviolet light stabilizers, wetting agents, flow control agents, leveling agents, rheological control agents, thickeners, antifoaming agents, catalysts, and a combination thereof.

Depending upon the type of crosslinking agent, the coating composition of this disclosure can be formulated as one-pack (1K) or two-pack (2K) coating composition. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents before being applied as determined by those skilled in the art.

In a typical two-pack coating composition comprising two packages, the two packages are mixed together shortly before application. The first package typically can contain the acrylic polymer, the polyesters, and the polytrimethylene ether diol and pigments. The pigments can be dispersed in the first package using conventional dispersing techniques, for example, ball milling, sand milling, and attritor grinding. The second package can contain the crosslinking agent, such as, a polyisocyanate crosslinking agent, and solvents.

The coating composition according to the disclosure can be suitable for vehicle and industrial coating and can be applied by conventional coating techniques. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

This invention is further directed to an article coated by the coating process or the coating composition of this invention. The article can be a vehicle, vehicle parts, or a combination thereof.

One of the advantages of this invention can be the reduction of VOC usage. Since the crosslinking component is in water, this invention reduces the contents of organic solvent in the coating composition, therefore reducing VOC emission. Another advantage of this invention can be that the same crosslinking component can be used for both solvent borne and waterborne coatings.

Testing Procedures

Dry to touch time—Dry to touch time is determined by ASTM D1640.

Gloss of a coating can be measured by a method described in ASTM D523. Gloss can be measured by a gloss meter (Model AG-4435, BYK-Gardner, Columbia, Md. 21046).

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Coating Compositions

Coating compositions were prepared according to the Table 1.

TABLE 1

Coating Compositions (parts by weight).

|  | Example | Comparative Example |
|---|---|---|
| Solvent borne crosslinkable component[1] | 100 | 100 |
| Solvent borne crosslinking component[2] | — | 50 |
| Water dispersible crosslinking agent[3] | 25 | — |
| Water[3] | 25 | — |
| Total | 150 | 150 |

[1]The solvent borne crosslinkable component used was a solvent borne polyurethane containing t-butylacetate, available as TU09-3001 from DuPont, Wilmington, DE, USA.
[2]The solvent borne crosslinking component used was 1,6-hexamethylene diisocyanate ("HDI") in t-butylacetate, available as TU09-AS from DuPont, Wilmington, DE, USA.
[3]The water dispersible crosslinking agent used was a solvent-free, water dispersible polyisocyanate based on hexamethylene diisocyanate (HDI), available as BAYHYDUR ® 302 from Bayer MaterialScience, Pittsburgh, PA, USA, under respective registered trademark. The crosslinking component was prepared by mixing the crosslinking agent with water.

Coating Properties

The coating compositions were applied by drawdown on substrates. Each substrate was a steel plate that had been coated with high solid epoxy primer Corlar® 2.1-PRTM) available from E. I. DuPont de Nemours and Company, Wilmington, Del., USA, under respective registered and unregistered trademarks. The coating compositions were wet drawdown onto the substrate over the dried primer layer forming and cured to a dry film at about 4 mil (about 100 micron) in thickness.

Dry time of the coating layers was measured according to ASTM D1640. Properties of the coating composition and the resulted coatings were measured and are shown in Table 2.

TABLE 2 properties.

|  | Example | Comparative Example |
| --- | --- | --- |
| Pot Life (hours) | 1.0 | 0.5 |
| Dry time (hours) | 0.5 | 1.0 |
| Gloss at 60° | 95 | 90 |

What is claimed is:

1. A process for producing a low VOC coating composition, said process comprising the steps of:
   A) providing a crosslinking component comprising one or more water dispersible crosslinking agents, said crosslinking component comprises in a range of from 10% to 90% of water based on the weight of the crosslinking component;
   B) providing a crosslinkable component comprising one or more organic solvents and at least one compound having one or more crosslinkable functional groups, said crosslinkable component comprises in a range of from 0% to 10% of water based on the weight of the crosslinkable component; and
   C) mixing said crosslinking component and said crosslinkable component to produce said low VOC coating composition;
   wherein, said low VOC coating composition comprises in a range of from 10% to 90% of water based on the weight of the low VOC coating composition and at least one of the one or more organic solvents consist of one or more water immiscible organic solvents that have a solubility in water from 0 to 2 wt. %.

2. The process of claim 1, wherein said crosslinking component is essentially free from organic solvents.

3. The process of claim 1, wherein at least one of said water dispersible crosslinking agents comprises a reaction product of an isocyanate and one or more monofunctional polyalkylene alcohols, or a reaction product of an isocyanate and one or more monofunctional polyalkylene oxides.

4. The process of claim 3, wherein said isocyanate is selected from aliphatic polyisocyanate, cycloaliphatic polyisocyanate, aromatic polyisocyanate, or a combination thereof.

5. The process of claim 3, wherein said isocyanate is selected from 2,4-toluene diisocyanate, 2,6-toluene diisocyanate ("TDI"), 4,4-diphenylmethane diisocyanate ("MDI"), 4,4'-dicyclohexyl methane diisocyanate, ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-imethyl-dicyclohexylmethane 4,4'-diisocyanate, triphenyl methane triisocyanate, 1,3,5-benzene triisocyanate, 2,4,6-toluene triisocyanate, a trimer of hexamethylene diisocyanate, or a combination thereof.

6. The process of claim 3, wherein at least one of said monofunctional polyalkylene alcohols is a polyethylene glycol.

7. The process of claim 3, wherein at least one of said monofunctional polyalkylene oxides is a polyethylene oxide.

8. A coating composition comprising:
   (a) a crosslinking component comprising one or more water dispersible crosslinking agents, said crosslinking component comprises in a range of from 10% to 90% of water based on the weight of the crosslinking component; and
   (b) a crosslinkable component comprising one or more organic solvents and at least one compound having one or more crosslinkable functional groups, said crosslinkable component comprises in a range of from 0% to 10% of water based on the weight of the crosslinkable component; and
   wherein, said coating composition comprises in a range of from 10% to 90% of water based on the weight of the coating composition and at least one of the one or more organic solvents consist of one or more water immiscible organic solvents that have a solubility in water from 0 to 2 wt. %.

9. The coating composition of claim 8, wherein said crosslinking component is essentially free from organic solvents.

10. The coating composition of claim 8, wherein at least one of said water dispersible crosslinking agents comprises a reaction product of an isocyanate and one or more monofunctional polyalkylene alcohols, or a reaction product of an isocyanate and one or more monofunctional polyalkylene oxides.

11. The coating composition of claim 10, wherein said isocyanate is selected from aliphatic polyisocyanate, cycloaliphatic polyisocyanate, aromatic polyisocyanate, or a combination thereof.

12. The coating composition of claim 10, wherein said isocyanate is selected from 2,4-toluene diisocyanate, 2,6-toluene diisocyanate ("TDI"), 4,4-diphenylmethane diisocyanate ("MDI"), 4,4'-dicyclohexyl methane diisocyanate, ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, triphenyl methane triisocyanate, 1,3,5-benzene triisocyanate, 2,4,6-toluene triisocyanate, a trimer of hexamethylene diisocyanate, or a combination thereof.

13. The coating composition of claim 10, wherein at least one or said monofunctional polyalkylene alcohols is a polyethylene glycol.

14. The coating composition of claim 10, wherein at least one or said monofunctional polyalkylene oxides is a polyethylene oxide.

15. An article coated with the coating composition of claim 8, 9, 10, 11, 12, 13, or 14.

16. The article of claim 15, wherein said article is a vehicle, vehicle parts, or a combination thereof.

17. A coating composition comprising:
(a) a crosslinking component comprising one or more water dispersible crosslinking agents, said crosslinking component comprises in a range of from 10% to 90% of water based on the weight of the crosslinking component; and
(b) a crosslinkable component consisting essentially of a solvent component and a binder component, said binder component consisting essentially of one or more binder compounds selected from the group consisting of one or more linear or branched acrylic polymers, one or more linear or branched polyesters, one or more linear or branched acrylic polymers having one or more crosslinkable functional groups, one or more linear or branched polyesters having one or more crosslinkable functional groups, and a combination thereof, wherein at least one of the one or more binder compounds has one or more said crosslinkable functional groups, said solvent component consisting essentially of in a range of from 0% to 10% of water and in a range of from 90% to 100% of one or more organic solvents; and
wherein, said coating composition comprises in a range of from 10% to 90% of water based on the weight of the coating composition and at least one of the one or more organic solvents consist of one or more water immiscible organic solvents that have a solubility in water from 0 to 2 wt. %.

18. The coating composition of claim 17, wherein all of said one or more organic solvents are water immiscible organic solvents.

19. The process of claim 1, wherein the one or more organic solvents is selected from the group consisting of tolune, xylene, methyl ethyl ketone, methyl isobutyl ketone, methyl amyl ketone, diisobutyl ketone, ethyl acetate, isobutyl acetate, tert-butyl acetate, dimenthyl carbonate, and a combination thereof.

\* \* \* \* \*